United States Patent
Kuo et al.

(10) Patent No.: US 10,737,442 B2
(45) Date of Patent: Aug. 11, 2020

(54) ELECTROPHOTOGRAPHY-BASED 3D PRINTING WITH IMPROVED LAYER REGISTRATION

(71) Applicant: Eastman Kodak Company, Rochester, NY (US)

(72) Inventors: Chung-Hui Kuo, Fairport, NY (US); James Douglas Shifley, Spencerport, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 60 days.

(21) Appl. No.: 16/203,757

(22) Filed: Nov. 29, 2018

(65) Prior Publication Data

US 2020/0171754 A1    Jun. 4, 2020

(51) Int. Cl.
B29C 64/393 (2017.01)
B29C 64/218 (2017.01)
(Continued)

(52) U.S. Cl.
CPC .......... B29C 64/393 (2017.08); B29C 64/218 (2017.08); G03G 15/224 (2013.01);
(Continued)

(58) Field of Classification Search
CPC .. G03G 15/00; G03G 15/225; G03G 15/6561; G03G 15/1625; G03G 15/224; G03G 15/24; G03G 15/5033; G03G 2215/00565; B33Y 30/00; B33Y 10/00; B33Y 50/02; B33Y 40/00; B29C 64/386;
(Continued)

(56) References Cited

U.S. PATENT DOCUMENTS 9,144,940 B2    9/2015    Martin
9,919,479 B2    3/2018    Baecker et al.
(Continued)

OTHER PUBLICATIONS

Measurement Specialties Technical Paper, "The LVDT: construction and principle of operation" (http://www.meas-spec.com/downloads/Principles_of_the_LVDT.pdt).

Primary Examiner — Xiao S Zhao
Assistant Examiner — Ninh V Le
(74) Attorney, Agent, or Firm — Kevin E. Spaulding

(57) ABSTRACT

An additive manufacturing system includes a transfer belt traveling along a belt path including first and second moveable-position rollers and a plurality of fixed-position rollers. The belt path includes a fixed-velocity portion from the first moveable position roller to the second moveable position roller, and a variable-velocity portion from the second moveable position roller to the first moveable position roller. An electrophotography engine positioned along the fixed-velocity portion deposits a part material layer onto the transfer belt, and an image transfer assembly positioned along the variable-velocity portion transfers the part material layer onto a receiver medium. An image sensing system positioned along the belt path between the second moveable position roller and the image transfer assembly captures an image which is analyzed to determine an in-track registration error, and the positions of the first and second moveable position rollers are adjusted to compensate for the in-track registration error.

9 Claims, 6 Drawing Sheets

(51) Int. Cl.
  *G03G 15/00* (2006.01)
  *G03G 15/22* (2006.01)
(52) U.S. Cl.
  CPC .............. *G03G 15/6561* (2013.01); *G03G 2215/00556* (2013.01)
(58) Field of Classification Search
  CPC ..... B29C 64/20; B29C 64/393; B29C 64/147; B29C 64/205; B29C 64/223; B29C 64/218
  See application file for complete search history.

(56) References Cited

U.S. PATENT DOCUMENTS

| | | |
|---|---|---|
| 10,112,379 B2 | 10/2018 | Sreekumar |
| 2013/0077996 A1 | 3/2013 | Hanson et al. |
| 2013/0077997 A1* | 3/2013 | Hanson ................. G03G 13/00 399/130 |
| 2013/0186549 A1 | 7/2013 | Comb et al. |
| 2013/0186558 A1 | 7/2013 | Comb et al. |
| 2016/0339646 A1* | 11/2016 | Baecker ................ B29C 64/393 |

* cited by examiner

ELECTROPHOTOGRAPHY-BASED 3D PRINTING WITH IMPROVED LAYER REGISTRATION

CROSS-REFERENCE TO RELATED APPLICATIONS

Reference is made to commonly assigned, co-pending U.S. patent application Ser. No. 16/203,773, entitled: "Electrophotography-based additive printing with improved layer registration," by C. H. Kuo et al., which is incorporated herein by reference.

FIELD OF THE INVENTION

This invention pertains to the field of electrophotography-based additive manufacturing systems for printing three-dimensional parts, and more particularly to a system having improved layer-to-layer registration.

BACKGROUND OF THE INVENTION

Additive manufacturing systems are used to build three-dimensional (3D) parts from digital representations of the 3D parts using one or more additive manufacturing techniques. Common forms of such digital representations would include the well-known AMF and STL file formats. Examples of commercially available additive manufacturing techniques include extrusion-based techniques, ink jetting, selective laser sintering, powder/binder jetting, electron-beam melting, and stereolithographic processes. For each of these techniques, the digital representation of the 3D part is initially sliced into a plurality of horizontal layers. For each sliced layer, a tool path is then generated, that provides instructions for the particular additive manufacturing system to form the given layer.

For example, in an extrusion-based additive manufacturing system, a 3D part (sometimes referred to as a 3D model) can be printed from the digital representation of the 3D part in a layer-by-layer manner by extruding a flowable part material. The part material is extruded through an extrusion tip carried by a printhead of the system, and is deposited as a sequence of layers on a substrate in an x-y plane. The extruded part material fuses to previously deposited part material, and solidifies upon a drop in temperature. The position of the printhead relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of objects under construction, which are not supported by the part material itself. A support structure may be built utilizing the same deposition techniques by which the part material is deposited. The host computer generates additional geometry defining the support structure for the overhanging or free-space segments of the 3D part being formed, and in some cases, for the sidewalls of the 3D part being formed. The support material adheres to the part material during fabrication, and is removable from the completed 3D part when the printing process is complete.

In two-dimensional (2D) printing, electrophotography (also known as xerography) is a technology for creating 2D images on planar substrates, such as printing paper and transparent substrates. Electrophotography systems typically include a conductive support drum coated with a photoconductive material layer, where latent electrostatic images are formed by electrostatic charging, followed by image-wise exposure of the photoconductive layer by an optical source. The latent electrostatic images are then moved to a developing station where part material is applied to charged areas, or alternatively to discharged areas of the photoconductive insulator to form visible images. The formed part material images are then transferred to substrates (e.g., printing paper) and affixed to the substrates with heat and/or pressure.

U.S. Pat. No. 9,144,940 (Martin), entitled "Method for printing 3D parts and support structures with electrophotography-based additive manufacturing," describes an electrophotography-based additive manufacturing method that is able to make a 3D part using a support material and a part material. The support material compositionally includes a first charge control agent and a first copolymer having aromatic groups, (meth)acrylate-based ester groups, carboxylic acid groups, and anhydride groups. The part material compositionally includes a second charge control agent, and a second copolymer having acrylonitrile units, butadiene units, and aromatic units.

The method described by Martin includes developing a support layer of the support structure from the support material with a first electrophotography engine, and transferring the developed support layer from the first electrophotography engine to a transfer medium. The method further includes developing a part layer of the 3D part from the part material with a second electrophotography engine, and transferring the developed part layer from the second electrophotography engine to the transfer medium. The developed part and support layers are then moved to a layer transfusion assembly with the transfer medium, where they are transfused together to previously-printed layers.

One issue that can arise in electrophotographic printing is that even small registration errors between the layers of part material can introduce non-uniformities in what should be smooth vertical surfaces that are easily detectible, both visually and tactilely. Registration errors in an electrophotographic printing system are typically on the order of 100 microns, even using standard registration compensation methods. This is insufficient to eliminate the detectable surface non-uniformities. There remains a need for an improved method for printing a three-dimensional part with an electrophotography-based additive manufacturing system to improve the registration of the part layers.

SUMMARY OF THE INVENTION

The present invention represents an electrophotography-based additive manufacturing system, including:
a transfer belt traveling along a belt path around a series of rollers, wherein the rollers includes:
a first moveable-position roller;
a second moveable-position roller; and
a plurality of fixed-position rollers;
wherein a portion of the belt path from the first moveable position roller to the second moveable position roller is a fixed-velocity portion, and a portion of the belt path from the second moveable position roller to the first moveable position roller is a variable-velocity portion;
a drive system positioned along the fixed-velocity portion of the belt path that drives the transfer belt in the fixed-velocity portion at a substantially constant belt velocity;
an electrophotography engine positioned along the fixed-velocity portion of the belt path that deposits a part material layer onto the transfer belt;

an image transfer assembly positioned along the variable-velocity portion of the belt path that transfers the part material layer onto a receiver medium;

an image sensing system positioned along the belt path between the second moveable position roller and the image transfer assembly adapted to capture an image of the part material layer on the transfer belt; and a control system that:

analyzes a captured image from the image sensing system to determine an in-track registration error between an intended position of the part material layer and an actual position of the part material layer; and adjusts the positions of the first and second moveable position rollers to adjust the velocity of the variable-velocity portion of the transfer belt thereby adjusting the position of the part material layer to compensate for the in-track registration error before the part material layer reaches the image transfer assembly.

This invention has the advantage that registration errors in the printed part material layer can be corrected with an improved accuracy such that any nonuniformities in the surfaces will be reduced to an acceptable level.

It has the further advantage post processing operations will not be required to compensate for surface non-uniformities in the printed 3D parts.

BRIEF DESCRIPTION OF THE DRAWINGS

It is to be understood that the attached drawings are for purposes of illustrating the concepts of the invention and may not be to scale. Identical reference numerals have been used, where possible, to designate identical features that are common to the figures.

DETAILED DESCRIPTION OF THE INVENTION

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
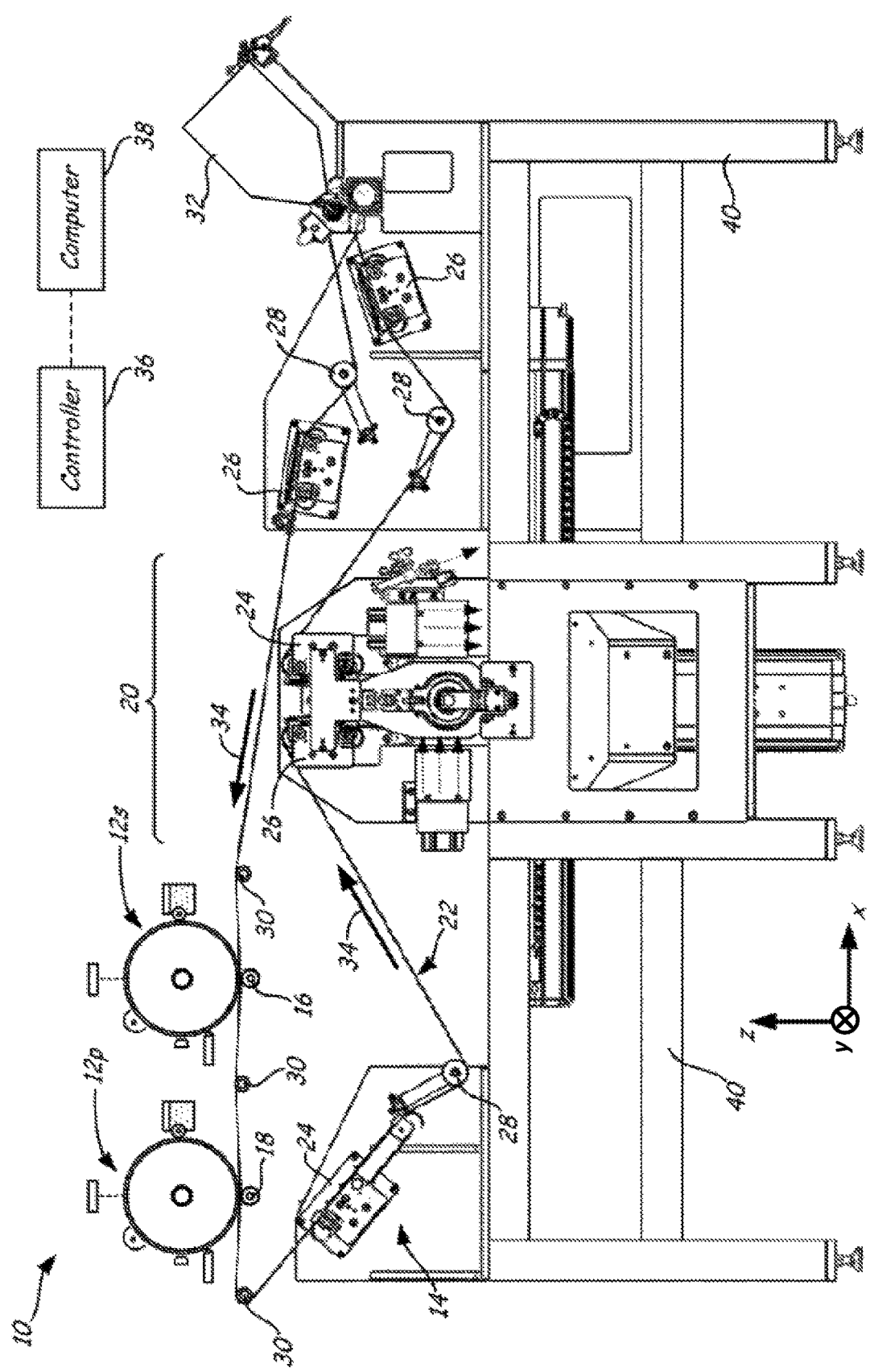
FIG. 1 is a schematic front view of an exemplary electrophotography-based additive manufacturing system for printing 3D parts and support structures from part and support materials.

FIGS. 1-4 illustrate an exemplary additive manufacturing system 10, which uses an electrophotography-based additive manufacturing process for printing 3D parts from a part material (e.g., an ABS part material), and associated support structures from a removable support material. As shown in FIG. 1, additive manufacturing system 10 includes a pair of electrophotography (EP) engines 12p and 12s, belt transfer assembly 14, biasing mechanisms 16 and 18, and layer transfusion assembly 20.

Examples of suitable components and functional operations for additive manufacturing system 10 include those disclosed in U.S. Patent Application Publication No. 2013/0077996 (Hanson et al.), entitled "Electrophotography-based additive manufacturing system with reciprocating operation;" in U.S. Patent Application Publication No. 2013/0077997 (Hanson et al.), entitled "Electrophotography-based additive manufacturing system with transfer-medium service loop;" in U.S. Patent Application Publication No. 2013/0186549 (Comb et al.), entitled "Layer transfusion for additive manufacturing;" and in U.S. Patent Application Publication No. 2013/0186558 (Comb et al.), entitled "Layer transfusion with heat capacitor belt for additive manufacturing," each of which is incorporated herein by reference.

EP engines 12p and 12s are imaging engines for respectively imaging or otherwise developing layers of the part and support materials, where the part and support materials are each preferably engineered for use with the particular architecture of EP engine 12p and 12s. The part material compositionally includes part material particles, and the support compositionally includes support material particles. In an exemplary embodiment, the support material compositionally includes support material particles including a first charge control agent and a first copolymer having aromatic groups, (meth)acrylate-based ester groups, carboxylic acid groups, and anhydride groups; and the part material compositionally includes part material particles including a second charge control agent, and a second copolymer having acrylonitrile units, butadiene units, and aromatic units. As discussed below, the developed part and support layers are transferred to belt transfer assembly 14 (or some other appropriate transfer medium) with biasing mechanisms 16 and 18, and carried to the layer transfusion assembly 20 to produce the 3D parts and associated support structures in a layer-by-layer manner.

In the illustrated configuration, belt transfer assembly 14 includes transfer belt 22, which serves as the transfer medium, belt drive mechanisms 24, belt drag mechanisms 26, loop limit sensors 28, idler rollers 30, and belt cleaner 32, which are configured to maintain tension on the transfer belt 22 while transfer belt 22 rotates in rotational direction 34. In particular, the belt drive mechanisms 24 engage and drive the transfer belt 22, and the belt drag mechanisms 26 function as brakes to provide a service loop design for protecting the transfer belt 22 against tension stress, based on monitored readings from the loop limit sensors 28.

Additive manufacturing system 10 also includes a controller 36, which includes one or more control circuits, microprocessor-based engine control systems, or digitally-controlled raster imaging processor systems, and which is configured to operate the components of additive manufacturing system 10 in a synchronized manner based on printing instructions received from a host computer 38. Host computer 38 includes one or more computer-based systems configured to communicate with controller 36 to provide the print instructions (and other operating information). For example, host computer 38 can transfer information to controller 36 that relates to the individual layers of the 3D parts and support structures, thereby enabling additive manufacturing system 10 to print the 3D parts and support structures in a layer-by-layer manner.

The components of additive manufacturing system 10 are typically retained by one or more frame structures, such as frame 40. Additionally, the components of additive manufacturing system 10 are preferably retained within an enclosable housing (not shown) that prevents ambient light from being transmitted to the components of additive manufacturing system 10 during operation.

Figure 2:
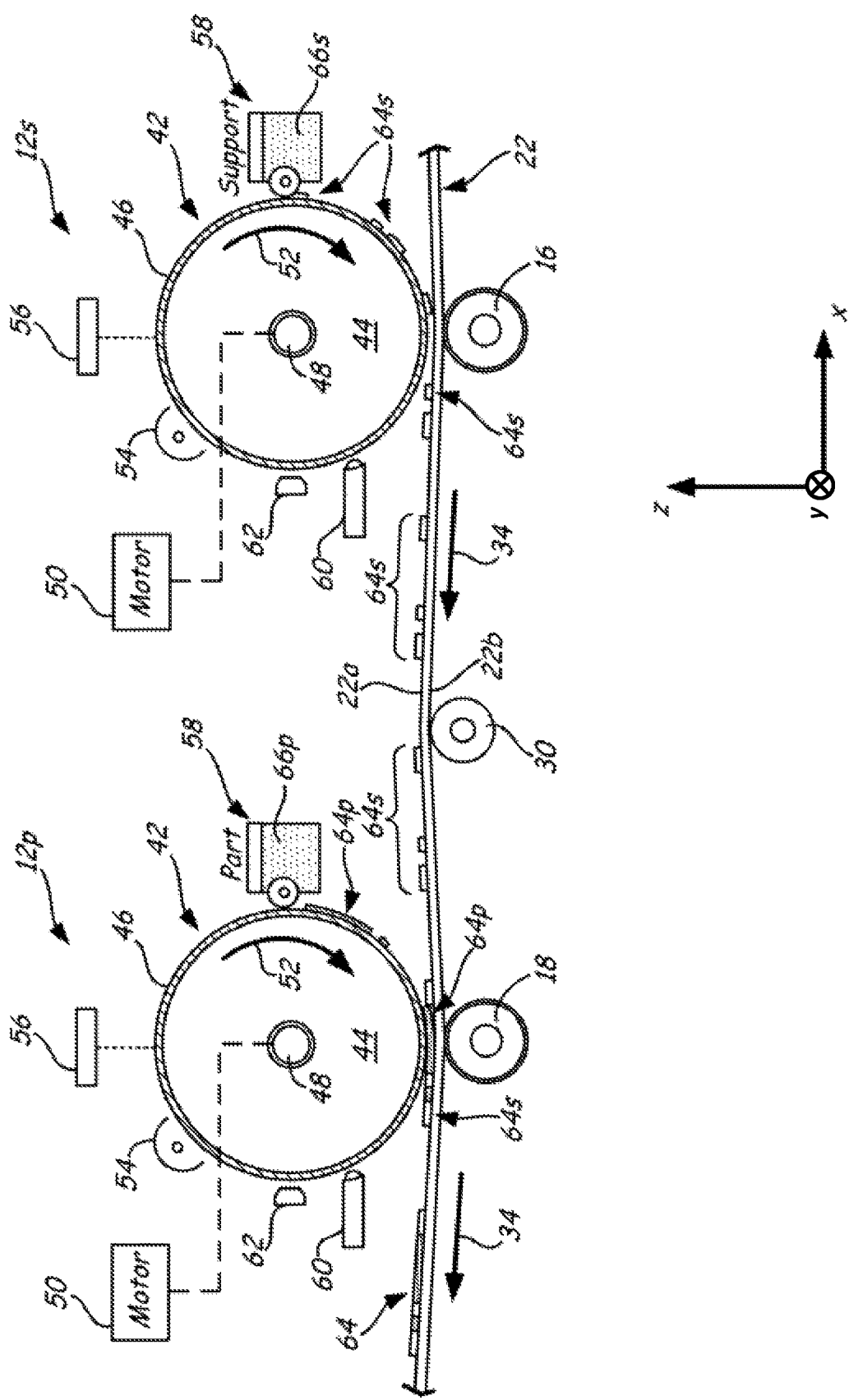
FIG. 2 is a schematic front view showing additional details of the electrophotography engines in the additive manufacturing system of FIG. 1.

FIG. 2 illustrates EP engines 12p and 12s in additional detail. EP engine 12s (i.e., the upstream EP engine relative to the rotational direction 34 of transfer belt 22) develops layers of support material 66s, and EP engine 12p (i.e., the downstream EP engine relative to the rotational direction 34 of transfer belt 22) develops layers of part material 66p. In alternative configurations, the arrangement of EP engines 12p and 12s can be reversed such that EP engine 12p is upstream from EP engine 12s relative to the rotational direction 34 of transfer belt 22. In other alternative configuration, additive manufacturing system 10 can include one or more additional EP engines for printing layers of additional materials.

In the illustrated configuration, EP engines 12p and 12s utilize identical components, including photoconductor drums 42, each having a conductive drum body 44 and a photoconductive surface 46. Conductive drum body 44 is an electrically-conductive drum (e.g., fabricated from copper, aluminum, tin, or the like) that is electrically grounded and configured to rotate around shaft 48. Shaft 48 is correspondingly connected to drive motor 50, which is configured to rotate the shaft 48 (and the photoconductor drum 42) in rotation direction 52 at a constant rate.

Photoconductive surface 46 is a thin film extending around the circumferential surface of conductive drum body 44, and is preferably derived from one or more photoconductive materials, such as amorphous silicon, selenium, zinc oxide, organic materials, and the like. As discussed below, photoconductive surface 46 is configured to receive latent-charged images of the sliced layers of a 3D part or support structure (or negative images), and to attract charged particles of the part or support material of the present disclosure to the charged (or discharged image areas), thereby creating the layers of the 3D part and support structures.

As further shown, EP engines 12p and 12s also include charging device 54, imager 56, development station 58, cleaning station 60, and discharge device 62, each of which is in signal communication with controller 36. Charging device 54, imager 56, development station 58, cleaning station 60, and discharge device 62 accordingly define an image-forming assembly for surface 46 while drive motor 50 and shaft 48 rotate photoconductor drum 42 in the rotation direction 52.

In the illustrated example, the image-forming assembly for photoconductive surface 46 of EP engine 12s is used to form support material layers 64s of support material 66s, where a supply of support material 66s is retained by development station 58 of EP engine 12s, along with associated carrier particles. Similarly, the image-forming assembly for photoconductive surface 46 of EP engine 12p is used to form part material layers 64p of part material part material 66p, where a supply of part material 66p is retained by development station 58 of EP engine 12p, along with associated carrier particles.

Charging device 54 is configured to provide a uniform electrostatic charge on the photoconductive surface 46 as the photoconductive surface 46 rotates in the rotation direction 52 past the charging device 54. Suitable devices that can be used for the charging device 54 include corotrons, scorotrons, charging rollers, and other electrostatic devices.

Imager 56 is a digitally-controlled, pixel-wise light exposure apparatus configured to selectively emit electromagnetic radiation toward the uniform electrostatic charge on the photoconductive surface 46 as the photoconductive surface 46 rotates in the rotation direction 52 past the imager 56. The selective exposure of the electromagnetic radiation on the photoconductive surface 46 is controlled by the controller 36, and causes discrete pixel-wise locations of the electrostatic charge to be removed (i.e., discharged to ground), thereby forming latent image charge patterns on the photoconductive surface 46. The imager 56 in the EP engine 12p is controlled to provide a latent image charge pattern in accordance with a specified pattern for a particular part material layer 64p, and the imager 56 in the EP engine 12s is controlled to provide a latent image charge pattern in accordance with a specified pattern for a corresponding support material layer 64s.

Suitable devices for imager 56 include scanning laser light sources (e.g., gas or solid state lasers), light emitting diode (LED) array exposure devices, and other exposure device conventionally used in 2D electrophotography systems. In alternative embodiments, suitable devices for charging device 54 and imager 56 include ion-deposition systems configured to selectively deposit charged ions or electrons directly to the photoconductive surface 46 to form the latent image charge pattern. As such, as used herein, the term "electrophotography" includes "ionography."

Each development station 58 is an electrostatic and magnetic development station or cartridge that retains the supply of part material 66p or support material 66s, preferably in powder form, along with associated carrier particles. The development stations 58 typically function in a similar manner to single or dual component development systems and toner cartridges used in 2D electrophotography systems. For example, each development station 58 can include an enclosure for retaining the part material 66p or support material 66s and carrier particles. When agitated, the carrier particles generate triboelectric charges to attract the part material particles of the part material 66p or the support material particles of the support material 66s, which charges the attracted particles to a desired sign and magnitude, as discussed below.

Each development station 58 typically include one or more devices for transferring the charged part material 66p or support material 66s to the photoconductive surface 46, such as conveyors, fur brushes, paddle wheels, rollers or magnetic brushes. For instance, as the photoconductive surface 46 (having the latent image charge pattern) rotates past the development station 58 in the rotation direction 52, the particles of charged part material 66p or support material 66s are attracted to the appropriately charged regions of the latent image on the photoconductive surface 46, utilizing either charged area development or discharged area development (depending on the electrophotography mode being utilized). This creates successive part material layers 64p and support material layers 64s as the photoconductor drum 42 continues to rotate in the rotation direction 52, where the successive part material layers 64p and support material layers 64s correspond to the successive sliced layers of the digital representation of the 3D part and support structures.

The successive part material layers 64p and support material layers 64s are then rotated with photoconductive surfaces 46 in the rotation direction 52 to a transfer region in which the part material layers 64p and support material layers 64s are successively transferred from the photoconductor drums 42 to the transfer belt 22, as discussed below. While illustrated as a direct engagement between photoconductor drum 42 and transfer belt 22, in some preferred embodiments, EP engines 12p and 12s may also include intermediary transfer drums or belts, as discussed further below. The EP engines 12p and 12s are configured so that the part material layers 64p are transferred onto the transfer belt in registration with the corresponding support material layers 64s to provide combined layers 64.

After a given part material layer 64p or support material layer 64s is transferred from the photoconductor drum 42 to the transfer belt 22 (or an intermediary transfer drum or belt), drive motor 50 and shaft 48 continue to rotate the photoconductor drum 42 in the rotation direction 52 such that the region of the photoconductive surface 46 that previously held the developed layer passes the cleaning station 60. The cleaning station 60 is configured to remove any residual, non-transferred portions of part material 66p or support material 66s from the photoconductive surface 46. Suitable types of cleaning devices for use in the cleaning station 60 include blade cleaners, brush cleaners, electrostatic cleaners, vacuum-based cleaners, and combinations thereof.

After passing the cleaning station 60, the photoconductive surface 46 continues to rotate in the rotation direction 52 such that the cleaned regions of the photoconductive surface 46 pass by the discharge device 62 to remove any residual electrostatic charge on photoconductive surface 46 prior to starting the next cycle. Suitable types of discharge devices 62 include optical systems, high-voltage alternating-current corotrons and/or scorotrons, one or more rotating dielectric rollers having conductive cores with applied high-voltage alternating-current, and combinations thereof.

The transfer belt 22 is a transfer medium for transporting the developed part material layers 64p and support material layers 64s from photoconductor drum 42 (or an intermediary transfer drum or belt) to the layer transfusion assembly 20 (FIG. 1). Examples of suitable types of transfer belts 22 include those disclosed in Comb et al. in the aforementioned U.S. Patent Application Publication No. 2013/0186549 and U.S. Patent Application Publication No. 2013/0186558 by Comb et al. The transfer belt 22 includes a front surface 22a and a rear surface 22b, where the front surface 22a faces the photoconductive surfaces 46 of photoconductor drums 42 and the rear surface 22b is in contact with biasing mechanisms 16 and 18.

Biasing mechanisms 16 and 18 are configured to induce electrical potentials through transfer belt 22 to electrostatically attract the part material layers 64p and support material layers 64s from EP engines 12p and 12s, respectively, to the transfer belt 22. Because the part material layers 64p and support material layers 64s each represent only a single layer increment in thickness at this point in the process, electrostatic attraction is suitable for transferring the part material layers 64p and support material layers 64s from the EP engines 12p and 12s to the transfer belt 22.

Preferably, the controller 36 rotates the photoconductor drums 42 of EP engines 12p and 12s at the same rotational rates, such that the tangential velocity of the photoconductive surfaces 46 are synchronized with the line speed of the transfer belt 22 (as well as with any intermediary transfer drums or belts). This allows the additive manufacturing system 10 to develop and transfer the part material layers 64p and support material layers 64s in coordination with each other from separate developed images. In particular, as shown, each part material layer 64p is transferred to transfer belt 22 in proper registration with each support material layer 64s to produce the combined layer 64. As discussed below, this allows the part material layers 64p and support material layers 64s to be transfused together. To enable this, the part material 66p and support material 66s preferably have thermal properties and melt rheologies that are the same or substantially similar. Within the context of the present invention, "substantially similar thermal properties and melt rheologies" should be interpreted to be within 20% of regularly measured properties such as glass transition temperature, melting point and melt viscosity. As can be appreciated, some combined layers 64 transported to layer transfusion assembly 20 may only include support material 66s or may only include part material 66p, depending on the particular support structure and 3D part geometries and layer slicing.

In an alternative and generally less-preferred configuration, part material layers 64p and support material layers 64s may optionally be developed and transferred along transfer belt 22 separately, such as with alternating part material layers 64p and support material layers 64s. These successive, alternating layers 64p and 64s may then be transported to layer transfusion assembly 20, where they may be transfused separately to print the 3D part and support structure.

Figure 3:
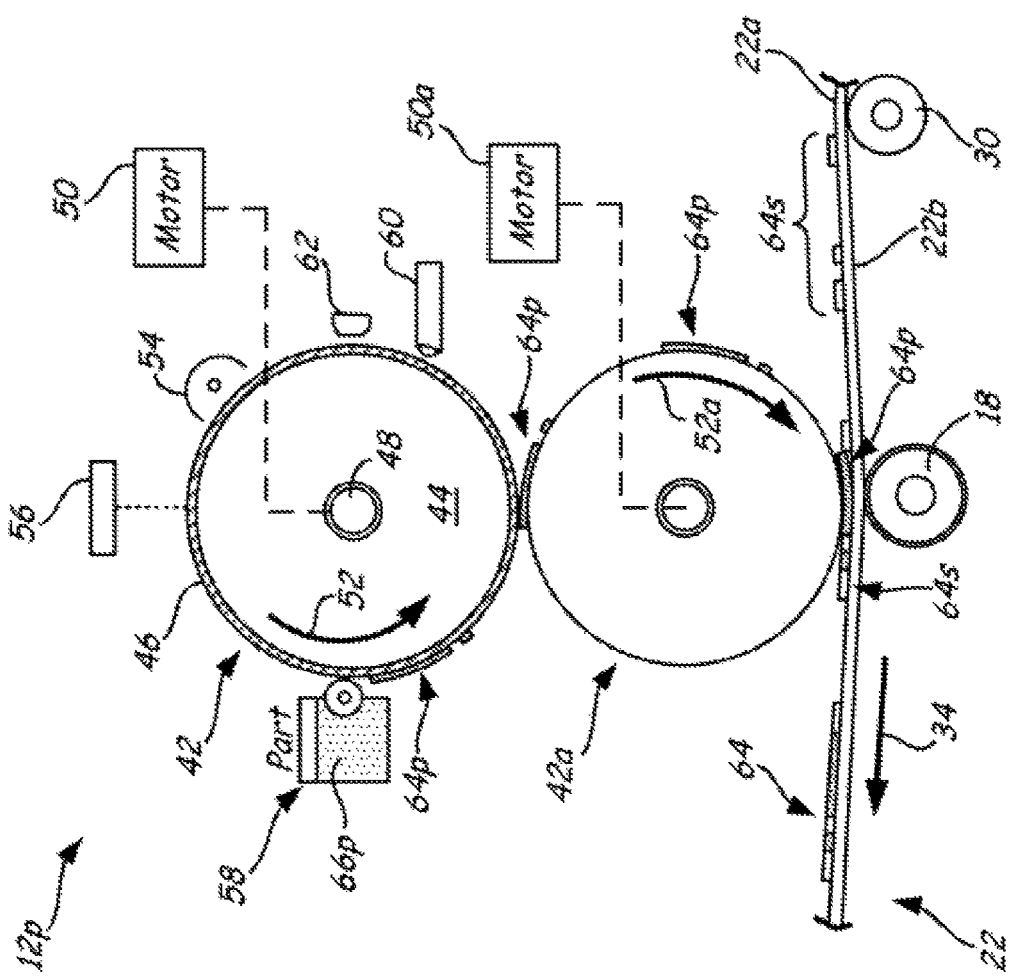
FIG. 3 is a schematic front view showing an alternative electrophotography engine, which includes an intermediary drum or belt.

In some configurations, one or both of EP engines 12p and 12s can also include one or more intermediary transfer drums or belts between the photoconductor drum 42 and the transfer belt 22. For example, FIG. 3 illustrates an alternate configuration for an EP engine 12p that also includes an intermediary drum 42a. The intermediary drum 42a rotates in a rotation direction 52a opposite to the rotation direction 52, under the rotational power of drive motor 50a. Intermediary drum 42a engages with photoconductor drum 42 to receive the developed part material layers 64p from the photoconductor drum 42, and then carries the received part material layers 64p and transfers them to the transfer belt 22.

In some configurations, the EP engine 12s (FIG. 2) can use a same arrangement using an intermediary drum 42a for carrying the developed support material layers 64s from the photoconductor drum 42 to the transfer belt 22. The use of such intermediary transfer drums or belts for EP engines 12p and 12s can be beneficial for thermally isolating the photoconductor drum 42 from the transfer belt 22, if desired.

Figure 4:
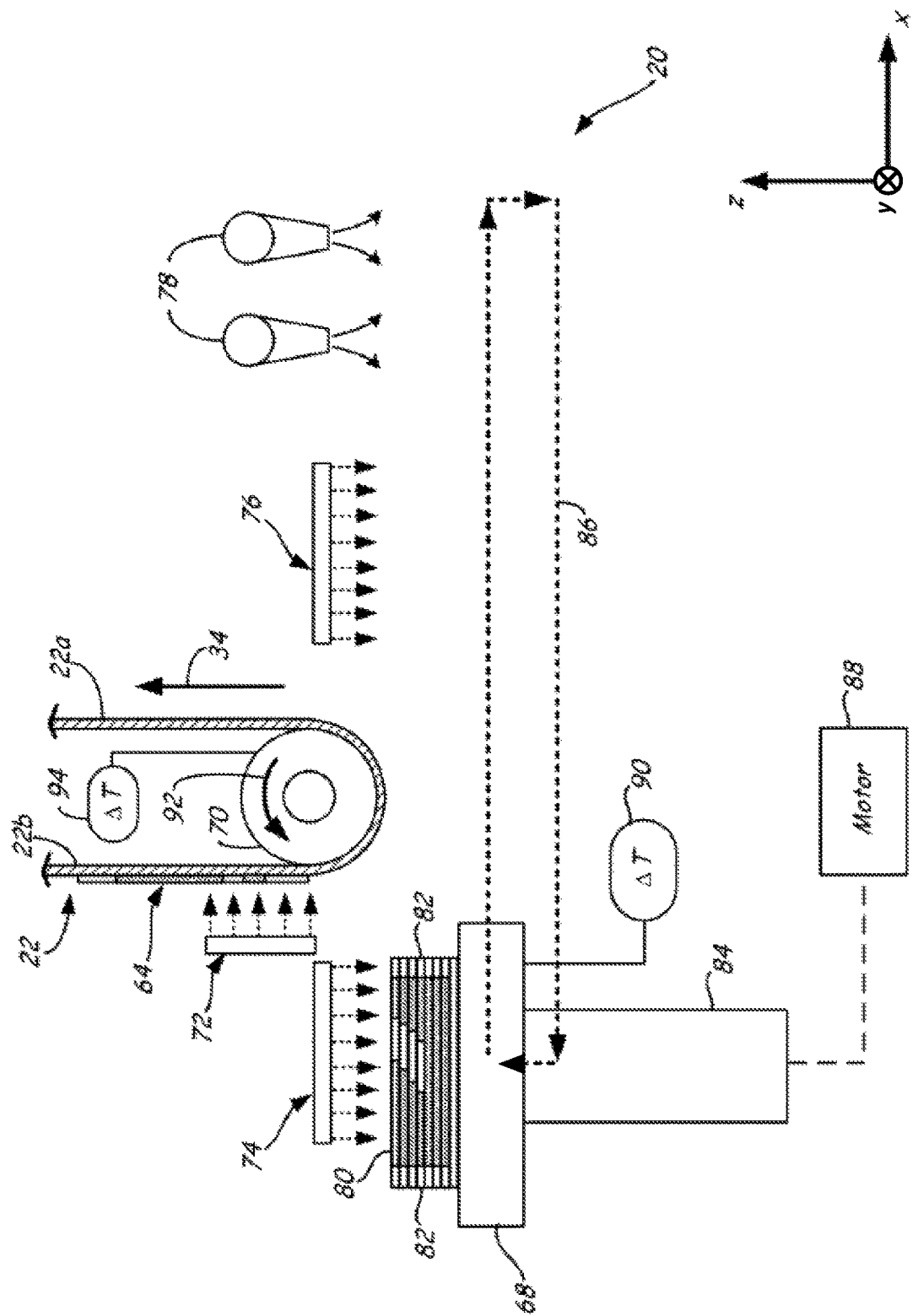
FIG. 4 is a schematic front view illustrating a layer transfusion assembly for performing layer transfusion steps.

FIG. 4 illustrates an exemplary configuration for the layer transfusion assembly 20. In the illustrated embodiment, the layer transfusion assembly uses a heating process to fuse the combined layer 64 to the previously printed layers of the 3D part 80 and support structure 82. In other embodiments, the layer transfusion assembly 20 can use other types of transfusion processes to perform the fusing operation. For example, a solvent process can be used to soften the part material 66p and the support material 66s so that they can be fused to the previously printed layers of the 3D part 80 and support structure 82 by pressing them together.

As shown, the layer transfusion assembly 20 includes build platform 68, nip roller 70, heaters 72 and 74, post-fuse heater 76, and air jets 78 (or other cooling units). Build platform 68 is a platform assembly or platen that is configured to receive the heated combined layers 64 (or separate part material layers 64p and support material layers 64s) for printing a 3D part 80 and support structure 82, in a layerby-layer manner. In some configurations, the build platform 68 may include removable film substrates (not shown) for receiving the combined layers 64, where the removable film substrates may be restrained against build platform using any suitable technique (e.g., vacuum drawing, removable adhesive, mechanical fastener, and the like).

The build platform 68 is supported by gantry 84, which is a gantry mechanism configured to move build platform 68 along the z-axis and the x-axis in a reciprocating rectangular motion pattern 86, where the primary motion is back-and-forth along the x-axis. Gantry 84 may be operated by a motor 88 based on commands from the controller 36, where the motor 88 can be an electrical motor, a hydraulic system, a pneumatic system, or the like.

In the illustrated configuration, the build platform 68 is heatable with heating element 90 (e.g., an electric heater). Heating element 90 is configured to heat and maintain the build platform 68 at an elevated temperature that is greater than room temperature (e.g., about 25° C.), such as at a desired average part temperature of 3D part 80 and support structure 82, as discussed by Comb et al. in the aforementioned U.S. Patent Application Publication No. 2013/0186549 and U.S. Patent Application Publication No. 2013/0186558. This allows build platform 68 to assist in maintaining the 3D part 80 and support structure 82 at the desired average part temperature.

Nip roller 70 is a heatable element or a heatable layer transfusion element, which is configured to rotate around a fixed axis with the movement of transfer belt 22. In particular, nip roller 70 may roll against the rear surface 22b in rotation direction 92 while the transfer belt 22 rotates in the rotation direction 34. In the illustrated configuration, nip roller 70 is heatable with heating element 94 (e.g., an electric heater). Heating element 94 is configured to heat and maintain nip roller 70 at an elevated temperature that is greater than the room temperature (e.g., 25° C.), such as at a desired transfer temperature for combined layers 64.

Heater 72 includes one or more heating device (e.g., an infrared heater or a heated air jet) configured to heat the combined layers 64 to a temperature near an intended transfer temperature of the part material 66p and support material 66s, such as at least a fusion temperature of the part material 66p and support material 66s, preferably prior to reaching nip roller 70. Each combined layer 64 preferably passes by (or through) heater 72 for a sufficient residence time to heat the combined layer 64 to the intended transfer temperature. Heater 74 may function in the same manner as heater 72, and heats the top surfaces of 3D part 80 and support structure 82 to an elevated temperature, such as at the same transfer temperature as the heated combined layers 64 (or other suitable elevated temperature).

As mentioned above, the support material 66s used to print support structure 82 preferably has thermal properties (e.g., glass transition temperature) and a melt rheology that are similar to or substantially the same as the thermal properties and the melt rheology of the part material 66p used to print 3D part 80. This enables the part material 66p of the part material layer 64p and the support material 66s of the support material layer 64s to be heated together with heater 74 to substantially the same transfer temperature, and also enables the part material 66p and support material 66s at the top surfaces of 3D part 80 and support structure 82 to be heated together with heater 74 to substantially the same temperature. Thus, the part material layers 64p and the support material layers 64s can be transfused together to the top surfaces of 3D part 80 and support structure 82 in a single transfusion step as combined layer 64. This single transfusion step for transfusing the combined layer 64 is typically impractical without sufficiently matching the thermal properties and the melt rheologies of the part material 66p and support material 66s.

Post-fuse heater 76 is located downstream from nip roller 70 and upstream from air jets 78, and is configured to heat the transfused layers to an elevated temperature to perform a post-fuse or heat-setting operation. Again, the similar thermal properties and melt rheologies of the part and support materials enable the post-fuse heater 76 to post-heat the top surfaces of 3D part 80 and support structure 82 together in a single post-fuse step.

Prior to printing 3D part 80 and support structure 82, build platform 68 and nip roller 70 may be heated to their desired temperatures. For example, build platform 68 may be heated to the average part temperature of 3D part 80 and support structure 82 (due to the similar melt rheologies of the part and support materials). In comparison, nip roller 70 may be heated to a desired transfer temperature for combined layers 64 (also due to the similar thermal properties and melt rheologies of the part and support materials).

During the printing operation, transfer belt 22 carries a combined layer 64 past heater 72, which may heat the combined layer 64 and the associated region of transfer belt 22 to the transfer temperature. Suitable transfer temperatures for the part and support materials include temperatures that exceed the glass transition temperatures of the part material 66p and the support material 66s, which are preferably similar or substantially the same, and where the part material 66p and support material 66s of combined layer 64 are softened but not melted (e.g., to a temperature ranging from about 140° C. to about 180° C. for an ABS part material).

As further shown in the exemplary configuration of FIG. 4, during operation, gantry 84 moves the build platform 68 (with 3D part 80 and support structure 82) in a reciprocating rectangular motion pattern 86. In particular, the gantry 84 moves build platform 68 along the x-axis below, along, or through heater 74. Heater 74 heats the top surfaces of the 3D part 80 and support structure 82 to an elevated temperature, such as the transfer temperatures of the part and support materials. As discussed by Comb et al. in the aforementioned U.S. Patent Application Publication No. 2013/0186549 and U.S. Patent Application Publication No. 2013/0186558, heaters 72 and 74 can heat the combined layers 64 and the top surfaces of the 3D part 80 and support structure 82 to about the same temperatures to provide a consistent transfusion interface temperature. Alternatively, heaters 72 and 74 can heat the combined layers 64 and the top surfaces of the 3D part 80 and support structure 82 to different temperatures to attain a desired transfusion interface temperature.

The continued rotation of transfer belt 22 and the movement of build platform 68 align the heated combined layer 64 with the heated top surfaces of the 3D part 80 and support structure 82 with proper registration along the x-axis. The gantry 84 continues to move the build platform 68 along the x-axis at a rate that is synchronized with the tangential velocity of the transfer belt 22 (i.e., the same directions and speed). This causes rear surface 22b of the transfer belt 22 to rotate around nip roller 70 and brings the heated combined layer 64 into contact with the top surfaces of 3D part 80 and support structure 82. This presses the heated combined layer 64 between the front surface 22a of the transfer belt 22 and the heated top surfaces of 3D part 80 and support structure 82 at the location of nip roller 70, which at least partially transfuses the heated combined layer 64 to the top layers of 3D part 80 and support structure 82.

As the transfused combined layer 64 passes the nip of nip roller 70, the transfer belt 22 wraps around nip roller 70 to separate and disengage the transfer belt from the build platform 68. This assists in releasing the transfused combined layer 64 from the transfer belt 22, enabling the transfused combined layer 64 to remain adhered to the 3D part 80 and the support structure 82, thereby adding a new layer to the 3D part and the support structure 82. Maintaining the transfusion interface temperature at a transfer temperature that is higher than the glass transition temperatures of the part and support materials, but lower than their fusion temperatures, enables the heated combined layer 64 to be hot enough to adhere to 3D part 80 and support structure 82, while also being cool enough to readily release from transfer belt 22. Additionally, as discussed earlier, the similar thermal properties and melt rheologies of the part and support materials allow them to be transfused in the same step.

After release, the gantry 84 continues to move the build platform 68 along the x-axis to the post-fuse heater 76. At the post-fuse heater 76, the top-most layers of 3D part 80 and support structure 82 (including the transfused combined layer 64) are preferably heated to at least the fusion temperature of the part and support materials in a post-fuse or heat-setting step. This melts the part and support materials of the transfused layer 64 to a highly fusible state such that polymer molecules of the transfused layer 64 quickly inter-diffuse to achieve a high level of interfacial entanglement with the 3D part 80 and the support structure 82.

The gantry 84 continues to move the build platform 68 along the x-axis past post-fuse heater 76 to air jets 78, the air jets 78 blow cooling air towards the top layers of 3D part 80 and support structure 82. This actively cools the transfused layer 64 down to the average part temperature, as discussed by Comb et al. in the aforementioned U.S. Patent Application Publication No. 2013/0186549 and U.S. Patent Application Publication No. 2013/0186558.

To assist in keeping 3D part 80 and support structure 82 at the desired average part temperature, in some arrangements, one or both of the heater 74 and post-heater 76 can be configured to operate to heat only the top-most layers of 3D part 80 and support structure 82. For example, in embodiments in which heaters 72, 74, and 76 are configured to emit infrared radiation, 3D part 80 and support structure 82 can include heat absorbers or other colorants configured to restrict penetration of the infrared wavelengths to within only the top-most layers. Alternatively, heaters 72, 74, and 76 can be configured to blow heated air across the top surfaces of 3D part 80 and support structure 82. In either case, limiting the thermal penetration into 3D part 80 and support structure 82 allows the top-most layers to be sufficiently transfused, while also reducing the amount of cooling required to keep 3D part 80 and support structure 82 at the desired average part temperature.

The EP engines 12p and 12s have an associated maximum printable area. For example, the EP engines in the NexPress SX3900 have a maximum printing width in the cross-track direction (i.e., the y-direction) of about 340 mm, and a maximum printing length in the in-track direction (i.e., the x-direction) of about 904 mm. When building a 3D part 80 and support structure 82 having a footprint that is smaller than the maximum printable area of the EP engines 12p and 12s, the gantry 84 next actuates the build platform 68 downward, and moves the build platform 68 back along the x-direction following the reciprocating rectangular motion pattern 86 to an appropriate starting position in the x-direction in proper registration for transfusing the next combined layer 64. In some embodiments, the gantry 84 may also actuate the build platform 68 with the 3D part 80 and support structure 82 upward to bring it into proper registration in the z-direction for transfusing the next combined layer 64. (Generally the upward movement will be smaller than the downward movement to account for the thickness of the previously printed layer.) The same process is then repeated for each layer of 3D part 80 and support structure 82.

In prior art arrangements, the size of the 3D parts 80 that could be fabricated was limited by the maximum printable area of the EP engines 12p and 12s. It would be very costly to develop specially designed EP engines 12p and 12s having maximum printable areas that are larger than those used in typical printing systems. Commonly-assigned, U.S. Pat. No. 10,112,379, entitled "Large format electrophotographic 3D printer," which is incorporated herein by reference, describes methods for using EP engines to produce large parts by printing into a plurality of tile regions on a large build platform.

In conventional electrophotographic printing systems, it is necessary to register the different color channels of the printed image. In order to achieve this level of registration accuracy, registration marks are typically printed together with the image data and a sensor measures the registration error between an expected location and an actual location. The measured registration error is then used to correct subsequent images such that the registration errors are reduced to acceptable levels. Typically, the registration errors are corrected by modifying the image data to shift and/or scale the image data provided to the imager 56. The modifications are computed to alter the physical location of the developed image on the photoconductive surface 46 so that when it is overlaid on the previously printed color channels it will be properly aligned. Such registration correction methods rely on the registration errors being consistent from image-to-image. Typically, the residual registration errors will be on the order of 100 microns, which is acceptable for most color printing applications.

Commonly-assigned, co-pending U.S. patent application Ser. No. 15/091,789, entitled "Printing 3D parts with controlled surface finish," by T. Tombs et al., which is incorporated herein by reference, describes a method for controlling the surface finish of the printed 3D parts by utilizing a part material smaller particles on the surface of the 3D part while utilizing larger particles on the interior of the 3D part.

One problem that can occur in additive printing systems is that the thickness of the printed layers may deviate from their intended values, thereby distorting the geometry of the printed 3D part. Commonly-assigned, co-pending U.S. patent application Ser. No. 15/177,730 to T. Tombs, entitled "Feedback control system for printing 3D parts," which is incorporated herein by reference, discloses a method for compensating for these artifacts by utilizing a feedback mechanism to control the layer thickness.

When electrophotography-based printing systems are utilized for additive printing systems, any registration errors between the printed layers will manifest themselves as irregularities in what are intended to be smooth surfaces. The irregularities are typically most noticeable on vertical surfaces. While 100 micron registration errors are generally acceptable when printing visual color images, registration errors of this magnitude produce surface artifacts which are easily detected, both visually and tactilely, when printing 3D parts using an additive manufacturing system. In such applications an acceptable registration error tolerance to avoid objectionable artifacts is on the order of 5 microns. Conventional registration methods are not capable of achieving this level of registration accuracy. Consequently, it is typically necessary to perform post-processing operations on the printed 3D parts to remove the surface irregularities, for example by sanding the surface or using other finishing operations. The present invention represents an improved registration process that can be used to achieve reduced registration errors in electrophotography-based additive printing systems in order to mitigate the need for post-processing operations.

Figure 5:
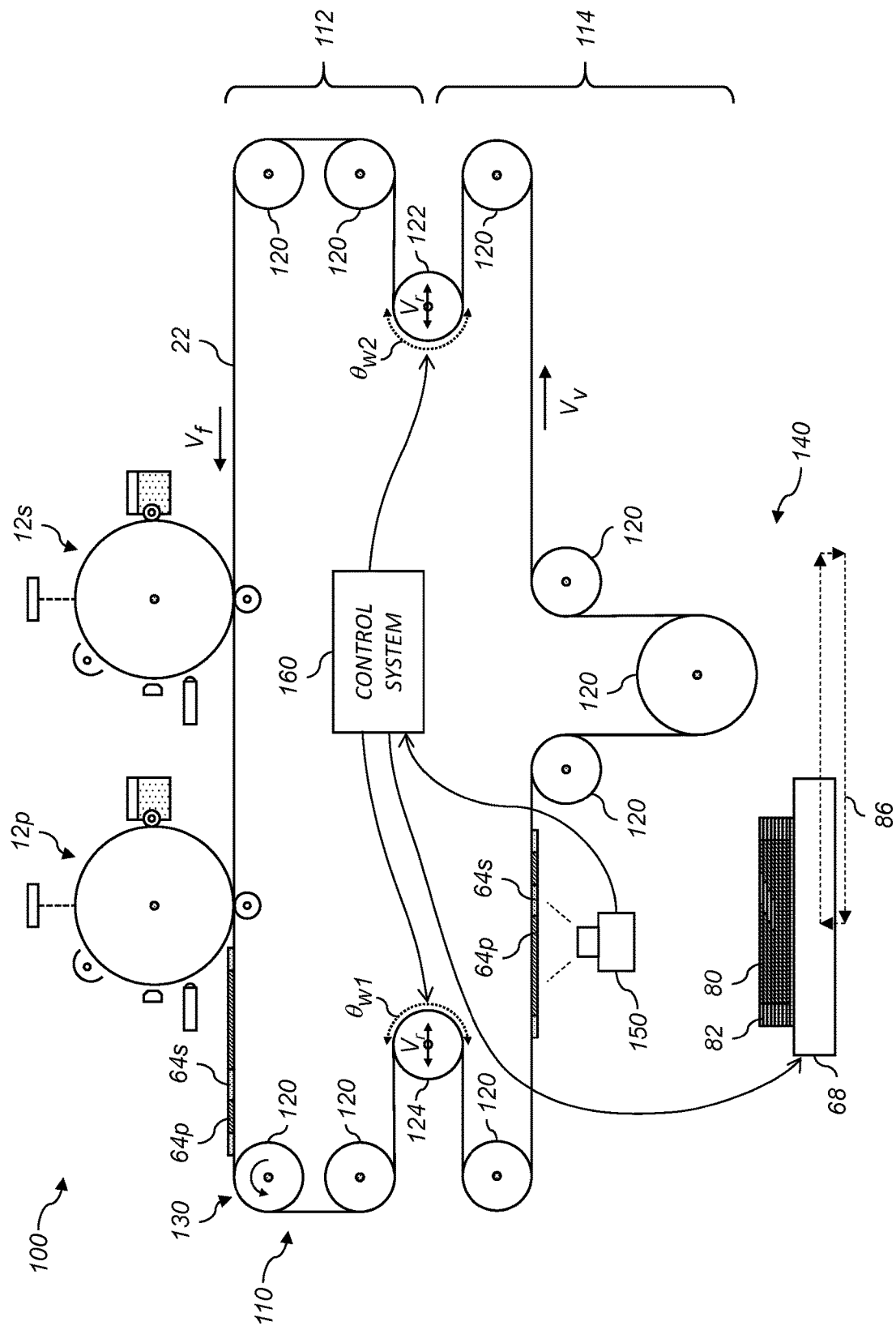
FIG. 5 is a schematic front view of an exemplary electrophotography-based additive manufacturing system in accordance with the present invention.

FIG. 5 illustrates an electrophotography-based additive manufacturing system 100 having improved layer-to-layer registration in accordance with the present invention. The additive manufacturing system 100 includes many components that are analogous to the additive manufacturing system 10 of FIG. 1, including an EP engine 12p for printing part material layers 64p onto a transfer belt 22 and an EP engine 12s for printing support material layers 64s onto the transfer belt 22 in registration with the part material layers 64p. The additive manufacturing system 100 also includes an image transfer assembly 140 which transfers the part and support material layers 64p, 64s onto a receiver medium (e.g., a build platform 68). In a preferred embodiment, the image transfer assembly 140 is analogous to the layer transfusion assembly 20 of FIG. 4 and transfuses the developed part and support material layers 64p, 64s from the transfer belt 22 onto previously printed layers on the build platform 68 to build up the printed 3D part 80 and the support structure 82 on a layer-by-layer basis. To accomplish this, the build platform 68 is moved according to a motion pattern 86 as was discussed in more detail relative to FIG. 4.

The transfer belt 22 moves along a belt path 110 around a series of rollers. The rollers include a first moveable-position roller 122, a second moveable-position roller 124, and a plurality of fixed-position rollers 120. The fixed-position rollers 120 rotate around a roller axis which is mounted to a frame (not shown) in a stationary position. The moveable-position rollers 122, 124 rotate around a roller axis that can be translated during the operation of the additive manufacturing system 100. In the illustrated embodiment, the transfer belt 22 wraps around the moveable-position rollers 122, 124 for wrap angles of $\theta_{w1} = \theta_{w2} = 180°$, and the moveable-position rollers 122, 124 can be controlled to translate their roller axes laterally in a horizontal direction. Preferably, the moveable-position rollers 122, 124 are translated together in the same direction so that the total path length around the belt path 110 is maintained at a constant length.

The belt path 110 includes a fixed-velocity portion 112 which extends from the first moveable-position roller 122, past the EP engines 12s, 12p, to the second moveable-position roller 124. The belt path 110 also includes a variable-velocity portion 114 which extends from the second moveable-position roller 124, past the image transfer assembly 140, and back to the first moveable-position roller 122. A drive system 130 is positioned along the fixed-velocity portion 112 of the belt path 110 that drives the transfer belt 22 in the fixed-velocity portion 112 at a substantially constant belt velocity. Within the context of the present disclosure, a substantially constant velocity is one that is constant to within the tolerances associated with the drive system 130, which are typically on the order of ±1%. In an exemplary embodiment, the drive system 130 is provided by one of the fixed-position rollers 120 being a drive roller, which is driven at a constant angular velocity by a motor (not shown).

As the moveable-position rollers 122, 124 are controlled to translate them laterally, this will have the effect of modifying the velocity of the transfer belt 22 in the variable-velocity portion 114 of the belt path 100. In the illustrated configuration, if the moveable-position rollers 122, 124 are moving to the left the velocity of the transfer belt 22 in the variable-velocity portion 114 will increase accordingly, and if the moveable-position rollers 122, 124 are moving to the right the velocity of the transfer belt 22 in the variable-velocity portion 114 will decrease. In the illustrated configuration where the moveable-position rollers 122, 124 have 180° wrap angles, it can be seen that the velocity $V_v$ of the variable-velocity portion 114 will be given by:

$$V_v = V_f + 2V_r$$

where $V_f$ is the velocity of the transfer belt 22 in the fixed-velocity portion 112, and $V_r$ is the velocity that the axes of the moveable-position rollers 122, 124 are being moved laterally (where positive values of $V_r$ correspond to movement toward the left in FIG. 5).

The additive manufacturing system 100 also includes an image sensing system 150 positioned along the belt path 110 between the second moveable position roller 124 and the image transfer assembly 140. The image sensing system 150 is adapted to capture an image of the part and support material layers 64p, 64s on the transfer belt 22. In an exemplary embodiment, the image sensing system 150 is a digital camera system including a 2D image sensor that captures an image of the part and support material layers 64p, 64s on the transfer belt 22. In other embodiments, the image sensing system 150 can include a linear image sensor that captures an image of the part and support material layers 64p, 64s on a line-by-line basis as the transfer belt 22 moves past the linear image sensor.

A control system 160 receives a captured image from the image sensing system 150 and analyzes the captured image to determine a registration error between an intended position of the part material layer 64p and an actual position of the part material layer 64p. In an exemplary embodiment, the intended position of the part material layer 64p is a theoretical position of the part material layer 64p if the registration was perfect. Alternatively, the position of the first part material layer 64p that is printed can define the intended position for all subsequent layers.

In a preferred embodiment, the actual position of the part material layer 64p is determined by detecting the position of one or more registration marks that are printed onto the transfer belt 22 as part of the part material layer 64p (e.g., in a peripheral area of the transfer belt 22 outside of the area corresponding to the 3D part 80 that is being formed by the additive manufacturing system). In some embodiments, the registration marks include pairs of crossed horizontal and vertical lines. Other types of registration marks commonly used in the art include marks having a diamond or triangular shape. The process of analyzing an image to detect the positions of registration marks is well-known in the art, and any such analysis method can be used in accordance with the present invention. In other embodiments, the control system 160 can determine the actual position of the part material layer 64p by analyzing the position of features of the part material layer 64p that will make up the final printed 3D part 80. For example, features of the part material layer 64p that can be determined would include corners or centroids of particular elements in the part material layer 64p. In some embodiments, the image of the part material layer 64p can be compared to the pattern of the part material layer 64p that was provided to the EP engine 12p in order to determine in-track and cross-track translations that will provide the best alignment.

The image sensing system 150 can capture an image of the entire deposited part material layer 64p, or alternately can capture an image of only a portion of the part material layer 64p containing features (e.g., registration marks) that can be detected to determine the actual position of the part material layer 64p. The image sensing system 150 should have a spatial resolution that is high enough such that the registration errors can be determined with an accuracy sufficient to provide the desired level of correction (e.g., 5 microns).

The determined registration error will typically include a cross-track registration error component $\Delta y_e$ and an in-track registration error component $\Delta x_e$. In a preferred embodiment, the control system 160 adjusts the positions of the first and second moveable position rollers 122, 124 to adjust the velocity of transfer belt 22 in the variable-velocity portion 114 of the belt path 110, thereby adjusting the position of the part material layer 64p (and the support material layer 64s) to compensate for the in-track registration error. For example, if the determined in-track registration error indicates that the part material layer 64p lags behind it's intended position, the moveable position rollers 122, 124 can be moved to the left in order to speed up the transfer belt 22 so that the position of the part material layer 64p catches up to its intended position. If the moveable position rollers 122, 124 are moved at a velocity $V_r$ for a time $\Delta t$, the moveable position rollers 122, 124 will move a corresponding distance $\Delta x_r = V_r \times \Delta t$. It can be seen that this will have the effect of advancing the position of the transfer belt 22 (and the part material layer 64p) by a distance of $\Delta x_b = 2\Delta x_r$. Therefore, to compensate for the in-track registration error, the moveable position rollers 122, 124 can be translated by a distance of $\Delta x_r = \Delta x_e/2$. The translation of the moveable position rollers 122, 124 should be completed before the time that the part material layer 64p reaches the image transfer assembly 140 so that it can be transferred to the build platform 68 in registration with the previously printed layers.

The adjustment of the positions of the moveable position rollers 122, 124 can be performed by any positioning mechanism known to those skilled in the art. In an exemplary embodiment, stepper motors are provided that are configured to translate the roller axes of the moveable position rollers 122, 124 in a lateral direction to a specified position. The resolution of the positioning mechanism should be high enough to compensate for the registration errors down to a desired accuracy level (e.g., 5 microns). The range of motion of the positioning mechanism should be sufficient to enable correction of the largest registration errors that are expected to be encountered.

In a preferred embodiment, the control system 160 also adjusts the cross-track position of the build platform 68 in order to compensate for the cross-track registration error $\Delta y_e$ determined by analyzing the image of the part material layer 64p captured by the image sensing system 150. The amount that the build platform 68 $\Delta y_p$ should be translated corresponds exactly to the magnitude of the determined cross-track registration error $\Delta y_e$. In other embodiments, a web steering mechanism can be used to make small adjustments in the cross-track position of the transfer belt 22 in proximity to the image transfer assembly 140 in order to compensate for the cross-track registration error $\Delta y_e$.

Preferably, the image sensing system 150 is positioned as close to the image transfer assembly 140 as possible such that the measured image position provides an accurate indication of the position that the part and support material layers 64p, 64s will be in when they reach the image transfer assembly 140. The position of the image sensing system 150 shown in FIG. 5 represents only one possible configuration. In other embodiments, the image sensing system 150 can be moved downstream to be closer to the nip where the part and support material layers 64p, 64s are transfused onto the build platform 68. The only requirement is that there must be sufficient time to adjust the positions of the moveable position rollers 122, 124 to compensate for the in-track registration error $\Delta x_e$ before the portion of the transfer belt 22 having the part and support material layers 64p, 64s reaches the image transfer assembly 140.

In a preferred embodiment, the image sensing system 150 has a resolution that is capable of detecting registration errors that are as small as 5 microns, and the positions of the moveable position rollers 122, 124 are controllable to an accuracy of 2.5 microns in order to accurately compensate for the detected in-track registration errors. Likewise, the cross-track position of the build platform 68 is preferably controllable to an accuracy of 5 microns in order to accurately compensate for the detected cross-track registration errors.

Figure 6:
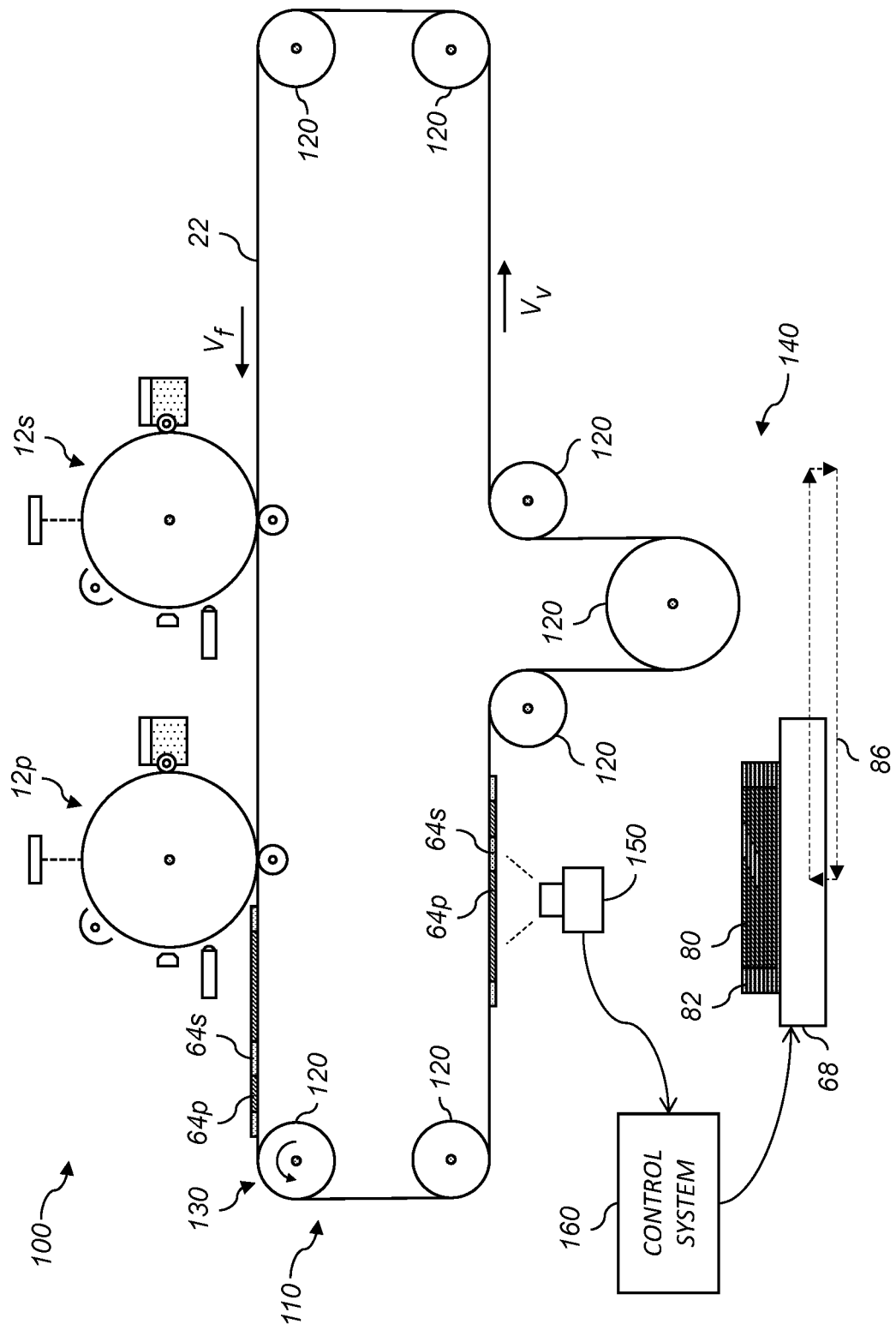
FIG. 6 is a schematic front view of an exemplary electrophotography-based additive manufacturing system in accordance with an alternate embodiment.

FIG. 6 illustrates an alternate embodiment of the invention. In this case, the belt path 110 does not include the moveable-position rollers 122, 124 of FIG. 5. In this configuration, the control system 160 analyzes captured images from the image sensing system 150 to determine a registration error between an intended position of the part material layer 64p and an actual position of the part material layer 64p as in the embodiment of FIG. 5. However, rather than adjusting roller positions to compensate for the in-track registration errors, the control system 160 controls the gantry 84 (FIG. 4) to adjust an initial in-track position of the build platform 68 on a layer-by-layer basis to compensate for the in-track component of the registration error such that the part material layer 64p (and the support material layer 64s) are transferred in register with the previously printed layers of the 3D part 80 and support structure 82. Likewise, the control system 160 preferably also adjusts an initial cross-track position of the build platform 68 on a layer-by-layer basis to compensate for the cross-track component of the registration error. In this embodiment, the adjustments to the initial position of the build platform 68 will be equal in magnitude to the registration errors determined by analyzing the images captured by the image sensing system 150.

While the exemplary embodiments discussed herein have been described with respect to an additive manufacturing system 100 that builds up layers of a 3D part 80 on a build platform, it will be obvious to one skilled in the art that the present invention can also be used for other types of additive manufacturing systems. For example, it can be used for systems which form printed electrical devices by depositing a sequence of layers of different materials. In this case, it is important that each of the layers be printed in proper registration with each other so that the printed electrical devices have their intended behavior.

The invention has been described in detail with particular reference to certain preferred embodiments thereof, but it will be understood that variations and modifications can be effected within the spirit and scope of the invention.

PARTS LIST 10 additive manufacturing system
12p electrophotography (EP) engine
12s electrophotography (EP) engine
14 belt transfer assembly
16 biasing mechanism 18 biasing mechanism
20 layer transfusion assembly
22 transfer belt
22a front surface
22b rear surface
24 belt drive mechanism
26 belt drag mechanism
28 loop limit sensor
30 idler roller
32 belt cleaner
34 rotational direction
36 controller
38 host computer
40 frame
42 photoconductor drum
42a intermediary drum
44 conductive drum body
46 photoconductive surface
48 shaft
50 drive motor
50a drive motor
52 rotation direction
52a rotation direction
54 charging device
56 imager
58 development station
60 cleaning station
62 discharge device
64 combined layer
64p part material layer
64s support material layer
66p part material
66s support material
68 build platform
70 nip roller
72 heater
74 heater
76 post-fuse heater
78 air jets
80 3D part
82 support structure
84 gantry
86 motion pattern
88 motor
90 heating element
92 rotation direction
94 heating element
100 additive manufacturing system
110 belt path
112 fixed-velocity portion
114 variable-velocity portion
120 fixed-position rollers
122 moveable-position roller
124 moveable-position roller
130 drive system
140 image transfer assembly
150 image sensing system
160 control system
$V_f$ fixed web velocity
$V_r$ moveable-position roller velocity
$V_v$ variable web velocity
$\theta_{w1}$ wrap angle
$\theta_{w2}$ wrap angle

The invention claimed is:
1. An electrophotography-based additive manufacturing system, comprising:
a transfer belt traveling along a belt path around a series of rollers, wherein the rollers include:
a first moveable-position roller;
a second moveable-position roller; and
a plurality of fixed-position rollers;
wherein a portion of the belt path from the first moveable position roller to the second moveable position roller is a fixed-velocity portion, and a portion of the belt path from the second moveable position roller to the first moveable position roller is a variable-velocity portion;
a drive system positioned along the fixed-velocity portion of the belt path that drives the transfer belt in the fixed-velocity portion at a substantially constant belt velocity;
an electrophotography engine positioned along the fixed-velocity portion of the belt path that deposits a part material layer onto the transfer belt;
an image transfer assembly positioned along the variable-velocity portion of the belt path that transfers the part material layer onto a receiver medium;
an image sensing system positioned along the belt path between the second moveable position roller and the image transfer assembly adapted to capture an image of the part material layer on the transfer belt; and
a control system that:
analyzes a captured image from the image sensing system to determine an in-track registration error between an intended position of the part material layer and an actual position of the part material layer; and
adjusts the positions of the first and second moveable position rollers to adjust a velocity of the variable-velocity portion of the transfer belt thereby adjusting a position of the part material layer to compensate for the in-track registration error before the part material layer reaches the image transfer assembly.

2. The electrophotography-based additive manufacturing system of claim 1, wherein the receiver medium is a build platform, and wherein the additive manufacturing system builds a three-dimensional part by building up a sequence of part material layers on the build platform.

3. The electrophotography-based additive manufacturing system of claim 2, wherein the image transfer assembly is an image transfusion assembly which transfuses the part material layer onto previously printed part material layers on the build platform.

4. The electrophotography-based additive manufacturing system of claim 1, wherein the control system moves the positions of the first and second moveable position rollers by the same distance such that a path length of the belt path is kept constant.

5. The electrophotography-based additive manufacturing system of claim 4, wherein the transfer belt wraps around the first and second moveable-position rollers with wrap angles that are substantially equal to 180 degrees, and wherein the control system moves the positions of the first and second moveable position rollers by a distance equal to half of the determined in-track registration error.

6. The electrophotography-based additive manufacturing system of claim 1, wherein the control system further analyzes the captured image from the image sensing system to determine a cross-track registration error and adjusts a cross-track position of the receiver medium to compensate for the cross-track registration error before the part material layer reaches the image transfer assembly.

7. The electrophotography-based additive manufacturing system of claim 1, wherein the control system determines the actual position of the part material layer by detecting the positions of features of the part material layer in the captured image.

8. The electrophotography-based additive manufacturing system of claim 1, wherein the part material layer deposited on the transfer belt includes one or more registration marks, and wherein the control system determines the actual position of the part material layer by detecting the positions of the one or more registration marks in the captured image.

9. The electrophotography-based additive manufacturing system of claim 1, further including a second electrophotography engine positioned along the fixed-velocity portion of the belt path that deposits a support material layer onto the transfer belt in registration with the part material layer, and wherein the image transfer assembly transfers the support material layer together with the part material layer.

* * * * *